United States Patent
Ishikawa et al.

(10) Patent No.: US 6,834,801 B2
(45) Date of Patent: Dec. 28, 2004

(54) CONTACTS BLOCK MECHANISM OF IC CONTACT CARD READER

(75) Inventors: Kazutoshi Ishikawa, Nagano (JP); Hisashi Yamamoto, Nagano (JP)

(73) Assignee: Sankyo Seiki Mfg. Co. Ltd., Nagano (JP)

(*) Notice: Subject to any disclaimer, the term of this patent is extended or adjusted under 35 U.S.C. 154(b) by 0 days.

(21) Appl. No.: 09/750,813

(22) Filed: Dec. 28, 2000

(65) Prior Publication Data

US 2002/0084326 A1 Jul. 4, 2002

(30) Foreign Application Priority Data

Dec. 28, 1999 (JP) .............................. 11-373598

(51) Int. Cl.⁷ ................................................ G06K 7/08
(52) U.S. Cl. ..................... 235/451; 235/439; 235/441
(58) Field of Search ................................. 235/451, 435, 235/436, 439, 441, 444, 440

(56) References Cited

U.S. PATENT DOCUMENTS

| | | | | |
|---|---|---|---|---|
| 5,045,674 A | * | 9/1991 | Mita et al. | 235/439 |
| 5,332,890 A | * | 7/1994 | Kitahara | 235/440 |
| 5,478,996 A | * | 12/1995 | Muto et al. | 235/441 |
| 5,554,840 A | * | 9/1996 | Saroya | 235/441 |
| 5,739,516 A | * | 4/1998 | Bricaud | 235/441 |
| 5,929,416 A | * | 7/1999 | Dos Santos Pato et al. | 235/439 |
| 5,984,183 A | * | 11/1999 | Moriya | 235/440 |
| 5,984,184 A | * | 11/1999 | Kojima | 235/441 |

FOREIGN PATENT DOCUMENTS

| | | |
|---|---|---|
| EP | 0 313 093 | 4/1989 |
| EP | 0 767 440 | 4/1997 |
| EP | 0 767 440 A2 | 4/1997 |
| EP | 0 853 289 | 7/1998 |
| EP | 0 853 289 A1 | 7/1998 |
| EP | 1 115 084 A2 | 11/2001 |
| GB | 2 328 052 | 2/1999 |
| JP | 0 800 7052 | 1/1996 |
| JP | 08 007052 | 1/1996 |

OTHER PUBLICATIONS

English Abstract of JP 08 007052.

* cited by examiner

*Primary Examiner*—Michael G. Lee
*Assistant Examiner*—Jamara A. Franklin
(74) *Attorney, Agent, or Firm*—Reed Smith LLP (57) ABSTRACT

In accordance with the invention, a contacts block mechanism of an IC contact card reader having a contacts block that contacts an input/output terminal on a card surface of an IC contact card for signal transmissions comprises contacts placed in the contacts block for making contact with the input/output terminal, a contacts attach/detach device for moving the contacts block into contact with or away from the input/output terminal and an IC card control circuit board to which one end of the contacts is electrically connected for signal transmissions with the IC card.

6 Claims, 11 Drawing Sheets

CONTACTS BLOCK MECHANISM OF IC CONTACT CARD READER

BACKGROUND OF THE INVENTION a) Field of the Invention

The present invention relates to a contacts block mechanism of an IC contact card reader. More specifically, the present invention relates to an improvement of the contacts block mechanism that transmits signals by contacting input/output terminals of an IC card.

b) Description of the Related Art

Figure 15:
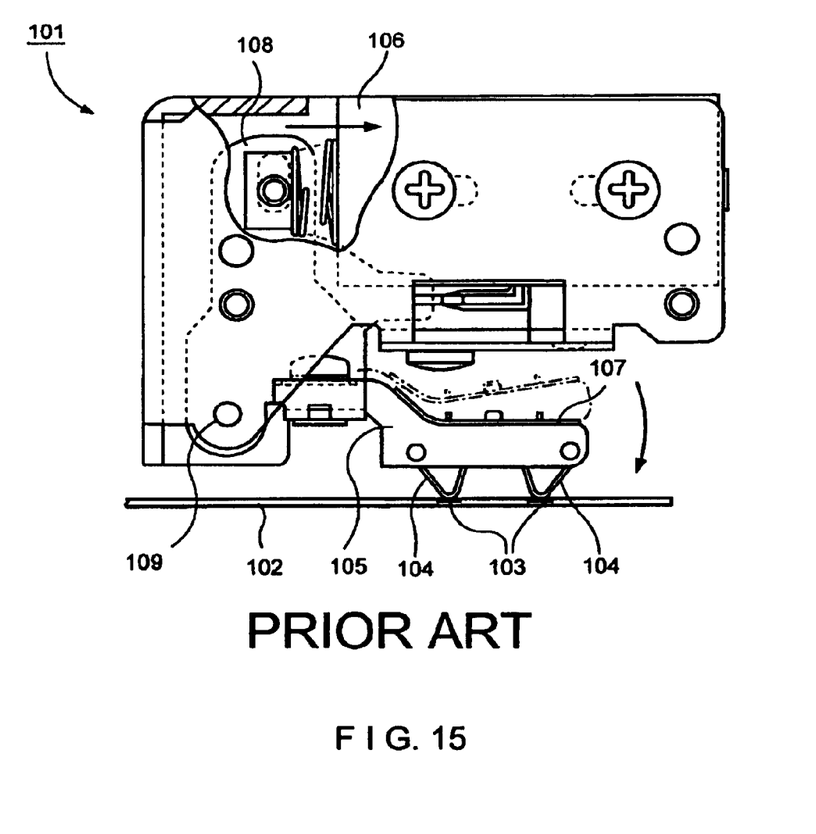
FIG. 15 is a side view of a conventional contacts block mechanism.

FIG. 15 illustrates a contacts block mechanism 101 in an IC contact card reader. A contacts block 105 for retaining/holding contacts 104 is lowered to a predetermined position to bring the contacts 104 of the card reader into contact with an input/output terminal 103 on the IC card 102. The contacts block 105 is turned with a fulcrum 109 as a center by moving a swing arm 108 with an actuator 106 such as a solenoid.

When the contacts block 105 is made movable in the above manner, a connection cable 107 having flexibility such as a flexible printed cable (hereinafter denoted as to "FPC") or a lead is used to connect the contacts 104 held by the contacts block 105 and an IC card control circuit board (not illustrated) provided in the IC card reader main body. The connection cable 107 follows the contacts block 105 so that the movement of the contacts block 105 is not hindered.

However, in the contacts block mechanism 101 with the above mentioned configuration, the electrically connected distance between the input/output terminals 103 on the IC card 102 and the IC card control circuit board is long. When an FPC or a lead is used, the mechanism is vulnerable to noise caused between the lines (cross-talk), disturbance, etc. When the signal lines of the connection cable 107 are wired in parallel over a long distance, the cross-talk occurs as an interference between the signals at the peaks or valleys of the signals, causing errors in operation. This is of serious concern in data transmission of the IC card 102 at high speed.

In prior technology, a condenser may be mounted between the terminals to remove noise. However, its effectiveness will be reduced because of the corrupted (or rounding) clock signals. Further, a FPC may be shielded or a shielded lead may be used. However, this method increases the rigidity of the connection cable 107, possibly obstructing the movement of the contacts block 105.

OBJECT AND SUMMARY OF THE INVENTION

An objective of the present invention is to provide a contacts block mechanism of an IC contact card reader that can prevent noise from occurring in a connection cable between an IC card and a control circuit board to protect [the signal transmission] from being affected by noise.

In accordance with the invention, a contacts block mechanism of an IC contact reader having a contacts block that contacts an input/output terminal on a card surface of an IC contact card for signal transmissions comprises contacts placed in the contact block for making contact with the input/output terminal, contacts attach/detach means for moving the contacts block into contact with or away from the input/output terminal and an IC card control circuit board, to which one end of the contacts is electrically connected for signal transmissions with the IC card.

DESCRIPTION OF THE PREFERRED EMBODIMENTS

FIG. 1 through FIG. 6 illustrate an embodiment of the present invention. A contacts block mechanism 1 of an IC contact card reader 10 of the present invention, having a contacts block 4 that transmits signals by contacting an input/output terminal 3 on a card surface of an IC contact card 2, contacts 5, a contacts attach/detach means 6, and an IC card control circuit board 7 (simply denoted as to "control circuit board" in this specification. The contacts 5 are placed in the contacts block 4 to contact the input/output terminal 3; the contacts attach/detach means 6 moves the contacts block 4 into contact with or away from the input/output terminal 3; and the control circuit board 7 is electrically connected to an end of the contacts 5 and control signal transmissions between the contacts 5 and the contact IC card 2.

Figure 1:
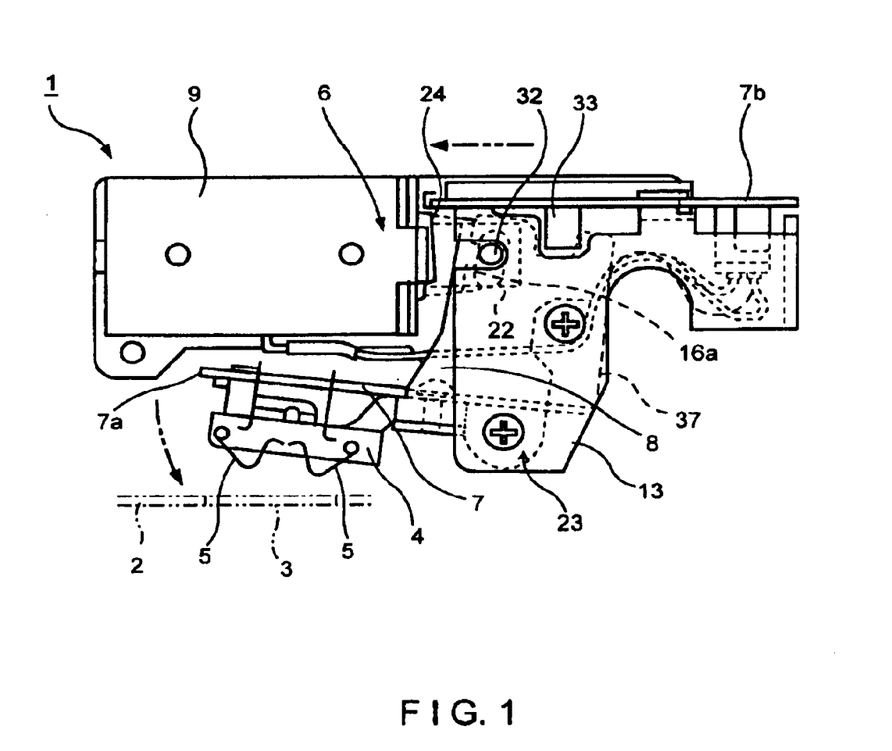
FIG. 1 is a side view of a contacts block mechanism in an embodiment of the present invention.

The contacts block 4 has the contacts 5, which make contact with the input/output terminal 3 on the contact IC card (hereinafter simply denoted as to "IC card") 2, along a card pathway 14, and is supported by the contacts attach/detach means 6 and positioned facing the card pathway 14. The contacts block 4 is capable of coming close to and moving away from the IC card 2 with the operation of the contacts attach/detach means 6, and attaches and detaches the contacts 5 on/from the surface of the IC card 2 to transmit signals.

The configuration of the contacts attach/detach means 6 is not specifically determined. In this embodiment, however, it consists of a swing arm 8 that attaches/detaches the contacts block 4 on/from the input/output terminal 3 on the IC card 2, and an actuator 9 that drives the swing arm 8. Although the configuration of the actuator 9 is also not specifically determined, a solenoid (hereinafter, code 9 is given) is used in this embodiment as illustrated.

As illustrated in FIG. 1, the swing arm 8 is provided inside frame 13 rotatable with a fulcrum 23 as a center and connected with a plunger 22 of a solenoid 9 by a pin at an upper fulcrum 32 located above the arm end on the swing side. The contacts block 4 is attached to the other end of the arm 8. As the swing arm 8 rotates, the contacts block 4 also rotates integrally with the fulcrum 23 as a center.

As illustrated in FIG. 1, the solenoid 9 rotatably connects the plunger 22 to the swing arm 8, and the swing arm 8 is turned as the plunger 22 is moved back and forth on a straight line. At this time, the plunger 22 is pushed to the projecting direction by a coil spring 24. When the solenoid 9 is not electrified, the plunger 22 is projected by the spring force to detach the contacts block 4 from the IC card 2 (or the card pathway 14). On the other hand, when it is electrified, the plunger 22 is pulled in an enclosure of the solenoid 9 to move the contacts block 4 toward the IC card 2.

The contacts 5 are the contact terminals that transmit signals by making contact with the input/output terminal 3 on the IC card 2 for data communication. The contacts 5 are constructed with, for example, a plurality of coil springs positioned according to the standard of the IC card 2. The coil springs are provided in two rows in the direction orthogonal to the coming direction of the IC card 2, for example. The coil spring is formed with a wedge-shaped end that makes contact with the IC card 2, as illustrated in FIG. 1, and also made of a flexible member so that a sufficient contact with the input/output terminal 3 can be obtained at contacts. On the other hand, the other end of the coil spring is soldered to the control circuit board 7 for electrical communication therebetween.

The control circuit board 7 communicates with the IC card 2 via the contacts 5 and functions as a signal transmitter that controls the transmissions of the signals from the IC card 2. The control circuit board 7 can be a single board. However, in this embodiment, the control circuit board 7 consists of two boards: as illustrated in FIG. 1, one board 7a is screwed onto the contacts block 4; and the other board 7b is fixed to the frame 13. Both boards 7a and 7b are connected by a relay cable 37.

In this embodiment, the contacts block mechanism 1 is established with the contacts block 4, contacts 5, contacts attach/detach means 6 (swing arm 8 and actuator 9), and control circuit board 7, and is mounted at a predetermined location in the IC card reader 10 via the frame 13. The above "establish" means that the contacts block mechanism 1 is made in a unit as a module. With this, only the module made in a unit should be replaced for upgrading the device, for example. Therefore, there is no need to change any other components in the IC contact card reader 10, but only the module needs to be changed. Thus, it is simple and easy.

Figure 3:
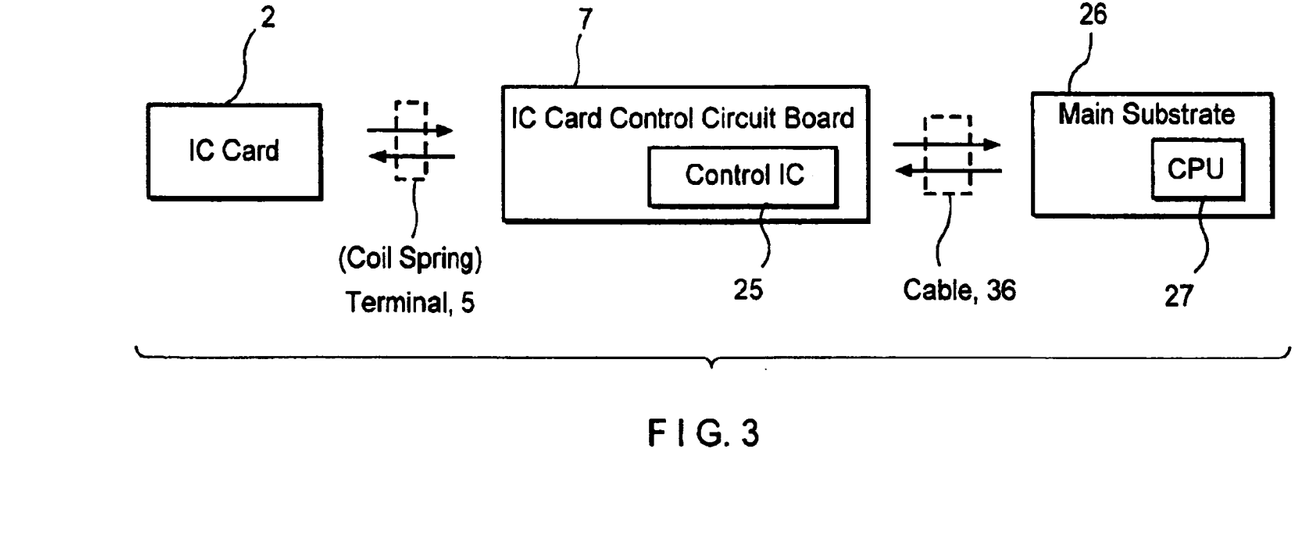
FIG. 3 illustrates the connection among control circuit board, main substrate, and IC card.

As illustrated in FIG. 3, the control circuit board 7 mounts a control IC 25 which is controlled by CPU 27 in a main substrate 26 set in the IC contact card reader 10. The control circuit board 7 can communicate with the input/output terminal 3 on the IC card 2 only through the contacts 5. In other words, the communication can be established only through the coil springs that construct the contacts 5, thus reducing noise between lines and disturbance.

Figure 2:
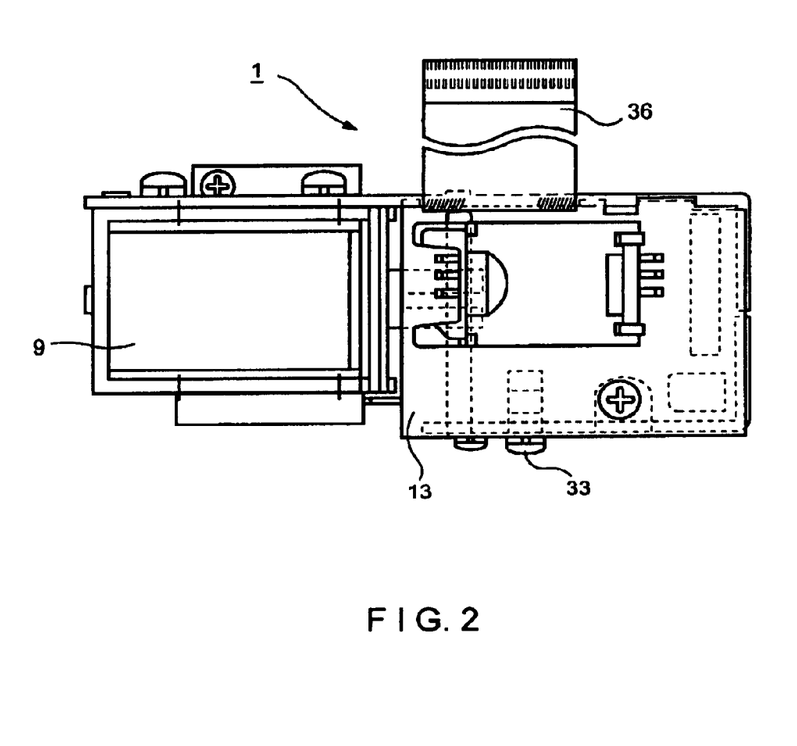
FIG. 2 is a plan view of the contacts block mechanism shown in FIG. 1.

Further, the control circuit board 7 and the main substrate 26 are connected by a main substrate relay cable 36 as illustrated in FIG. 2. Since the communication can be made by the signals resistant to noise, the noise caused between the board and substrate can be controlled by the control circuit board 7. Note that the relay cable 37 used for connecting both boards 7a and 7b that consist the control circuit board 7 is flexible because the contacts block 4 rotates and moves up and down.

Furthermore, the contacts block mechanism 1 in this embodiment has a sensor 33 for detecting the attachment/detachment of the block, as illustrated in FIG. 1 and FIG. 2. The sensor 33 detects the movement of the swing arm 8 to output the signals of attachment/detachment of the block. It is placed in the vicinity of the plunger 22 as illustrated.

Figure 4:
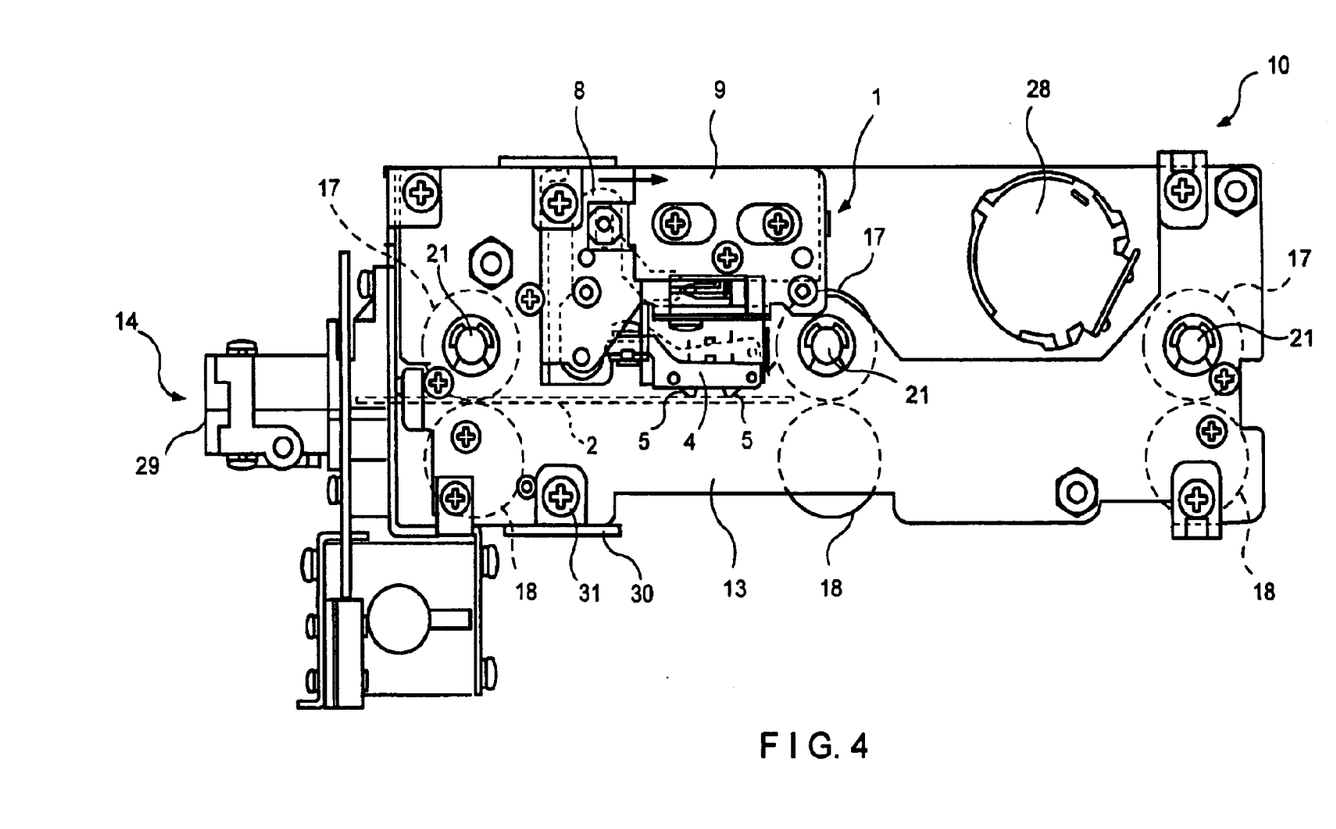
FIG. 4 is an internal side view of a configuration of an IC contact card reader in this embodiment.
Figure 5:
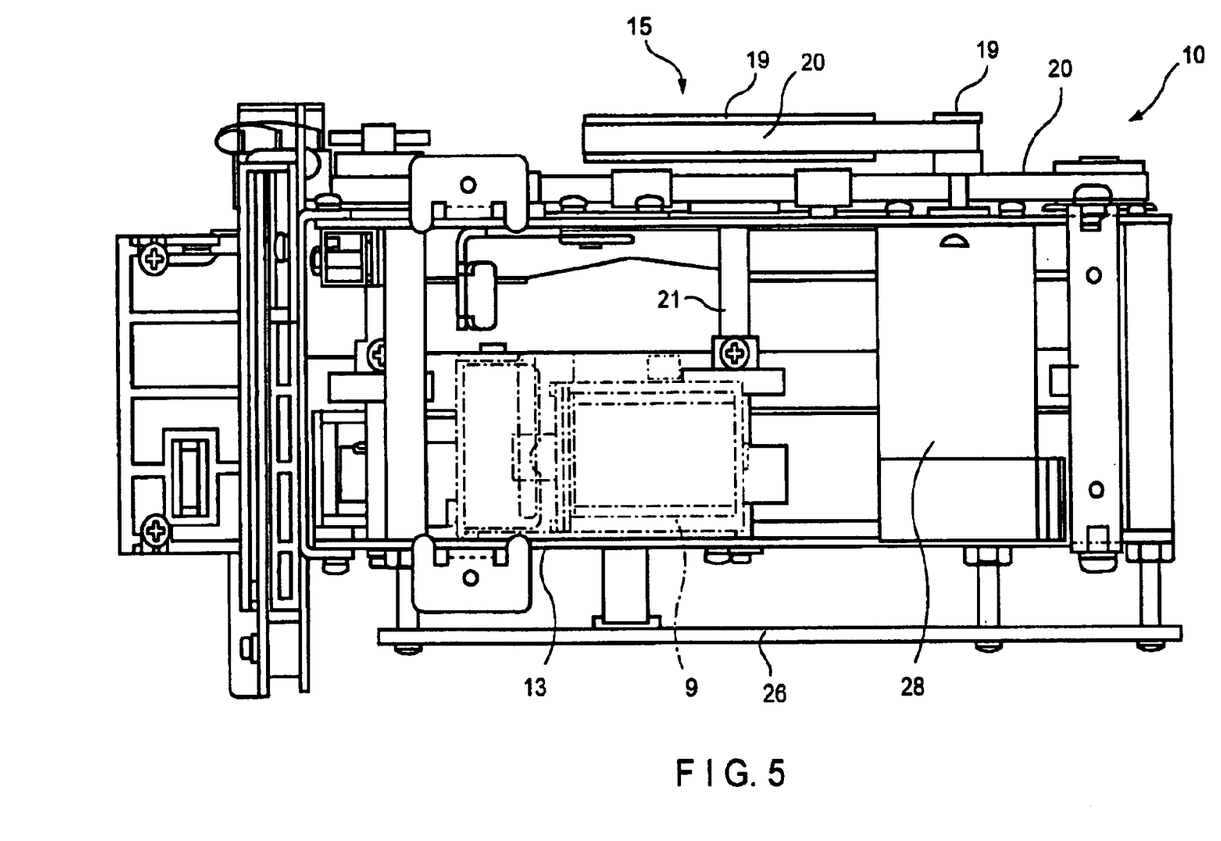
FIG. 5 is a plan view of the IC contact card reader.
Figure 6:
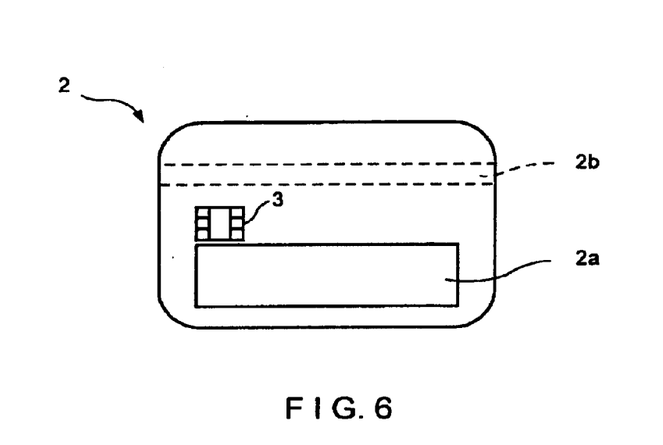
FIG. 6 shows an IC contact card.

The contacts block mechanism 1 in this embodiment has been described above. Hereinafter, the configuration of an IC contact card reader 10 which is equipped with the contacts block mechanism 1 will be described. As shown in FIGS. 4 and 5, the IC contact card reader 10 comprises a card pathway 14 in which the IC card 2 runs, a transport mechanism 15 for transporting the IC card 2, the block attachment/detachment sensor 33, a main substrate 26 as a controller, etc.

The transport means 15 has a drive motor 28, a pair of rollers consisting of a primary drive roller 17 and a secondary drive roller 18, and a drive pulley 19 and a transmission belt 20 that construct a drive transmitter. In this case, the primary drive roller 17 is fixed to a drive shaft 21 provided above the card pathway 14. The drive pulley 19 is fixed to the drive shaft 21 and a center shaft of rotation of the drive motor 28. Also, the secondary drive roller 18 is positioned facing the drive roller 17 via the card pathway 14. The transmission belt 20 is wound around the drive pulley 19. The drive force is transmitted to the drive shafts 21 through the transmission belt 20 and drive pulley 19. The drive shaft 21 is rotatably supported by frame 13 on top and bottom sides.

The center shaft (not illustrated) of the secondary drive roller 18 which is located closest to a card insertion slot 29 is supported by a bent portion of a sheet spring 30 as a pressing means at a free end. The other end of the sheet spring 30 is fixed to frame 13 by a screw, as illustrated in FIG. 4, and pushes the secondary roller 18 toward the primary drive roller 17. Although not specifically illustrated, a pair of rollers consisting of the primary and secondary drive rollers 17 and 18 are respectively positioned at both sides of the card pathway 14 in the width direction, both sides of the card pathway 14 being constructed with frame 13. A pair of the rollers are positioned to avoid embossed character portion 2a, input/output terminal 3, and magnetic stripe 2b on the IC card 2 shown in FIG. 6.

The main substrate 26 is a controller that controls the IC contact card reader 10, and the major portion thereof is mainly composed of a microcomputer. The main substrate 26 determines the inserted IC card 2 with the signal input from the IC contact card reader 10. When a stop signal is input from another sensor (not illustrated), the main substrate 26 stops the drive motor 28 to in turn stop the transport mechanism 15, and the solenoid 9 is electrified to move the contacts block 4. When the data transmission finishes, the main substrate 26 stops electrifying the solenoid 9 to rotate the drive motor in the reverse direction.

The operation of the IC contact card reader 10 configured as above will be described hereinafter. As the IC card 2 is inserted to the IC contact card reader 10 through the card insertion slot 29, the drive motor 28 is driven. Upon driving of the drive motor 28, the rotation of the motor 28 is transmitted to the primary drive roller 17 via the drive pulley 19, transmission belt 20, and drive shaft 21, and finally (further) a pair of rollers including the secondary roller 18 come into rotation.

The inserted IC card 2 is transported in the card pathway 14 while held by the primary drive roller 17 and secondary drive roller 18. Then, as a sensor (not illustrated) detects the presence of the IC card 2 and outputs a stop signal, a program command stored in CPU 27 stops the drive motor 28 and the solenoid 9 to pull the plunger 22 in the direction by an arrow in FIG. 1. As the plunger 22 moves, the swing arm 8 is rotated so that the contacts block 4 turns around the fulcrum 23 as a center as shown by an arrow. Consequently, the contacts block approaches toward the card pathway 14 as illustrated, and brings the contacts 5 supported thereby into contact with the input/output terminal 3 on the IC card 2 which is at halt.

When the input/output of the data to/from the IC card 2 is finished under this condition, the electrification to the solenoid 9 is turned off by the above mentioned program command. As a result, the plunger 22 is projected by the spring force of the coil spring 24, accompanied by the rotation of the swing arm 8, and the contacts block 4 move away from the card pathway 14 to a receded state. Now, the drive motor 28 rotates in reverse so that the IC card in the card pathway 14 is transported back to the card insertion slot 29 and discharged from the IC contact card reader 10.

As described above, the contacts block mechanism 1 of the IC contact card reader 10 of this embodiment has the contacts block 4 that inputs/outputs data by contacting the contacts 5 with the input/output terminal 3 on the IC card 2. Thus, the communication is performed with respect to the IC card 2.

In addition, according to the contacts block mechanism 1 of this embodiment, only the contacts 5 exist between the input/output terminal 3 on the IC card 2 and the control circuit board 7. Therefore, the communication is made only through the coil springs that construct the contacts 5, thus making it possible to reduce the noise between lines and disturbance. Further, although the control circuit board 7 and main substrate 26 are connected by the main substrate relay cable 36, the noise therebetween can be reduced (controlled) by the control circuit board 7.

Furthermore, the contacts block mechanism 1 is a module which the contacts block 4, contacts 5, contacts attach/detach means 6, and control circuit board 7 are made in a unit. Therefore, for upgrading demands of customers, for example, only the above mentioned modular unit is replaced and there is no need to replace any other components of the IC contact card reader 10. Thus it is simple and easy.

Also, the primary drive roller 17 and secondary drive roller 18 are positioned in this IC contact card reader 10 to hold the IC card 2 avoiding the embossed character section 2a, input output terminal 3, and magnetic stripe 2b on the IC card 2. Therefore, the wear-out or contamination on the embossed character section 2a and magnetic stripe 2b on the IC card 2, which normally caused by the primary drive roller 17 and secondary roller 18 holding the sections, can be reduced, improving the durability of the IC card 2.

Moreover, if the solenoid 9 is not electrified unless a stop signal is output from the sensor (not illustrated), the contacts 5 will not make contact with the IC card 2. Consequently, the running resistance [of the card] will not be increased while the magnetic read/write functions are at work.

Note that although the above described embodiment is a preferred example of the embodiments, it is not limited to this, but it can be variously modified within the scope of the present invention. For example, in the above embodiment, the presence of the IC card is detected by the sensor, and the contacts block 4 is operated based on the detection signal.

However, the movement of the contacts block 4 may directly be associated with the movement of the IC card. In another embodiment illustrated in FIG. 7 through FIG. 14, the contacts attach/detach means 6 of the contacts block mechanism 1 is configured with a switch 11, which is capable of attaching to and detaching from the IC card 2, and a moving member 12, which follows the movement of the switch 11 and brings the contacts block 4 into contact with the input/output terminal 3.

The switch 11 is a contact member projecting from the side end of the moving member 12 in the card running direction downward across the card pathway 14, and is pushed by the incoming end of the IC card 2 to move the moving member 12 in the card running direction.

The moving member 12 moves together with the switch 11 within a predetermined stroke when the IC card 2 pushes the switch 11. The moving member 12 is mounted with a long hole (not illustrated) parallel to the card running direction and a pin that engages with the long hole so that it is capable of moving parallel to the card running direction. Also, the moving member 12 is pushed toward the card insertion slot 29. In this embodiment, the moving member 12 is pushed by a pushing member 38, one end of which is attached to a transmission rod 35 that guides the contacts block 4 up and down.

Figure 9:
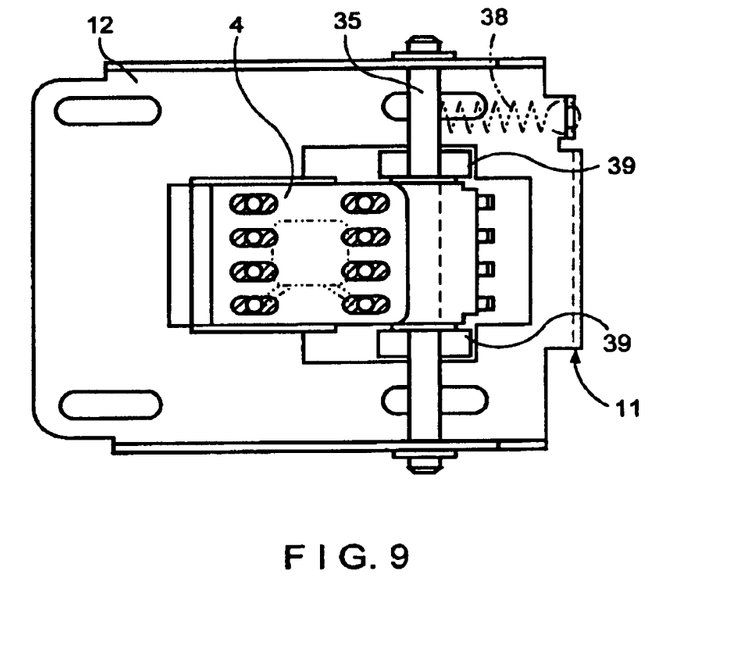
FIG. 9 is a plan view showing a switch, which is capable of contacting/separating from the IC card, and the contacts block mechanism, which moves up and down linked with the movement of the switch.
Figure 10:
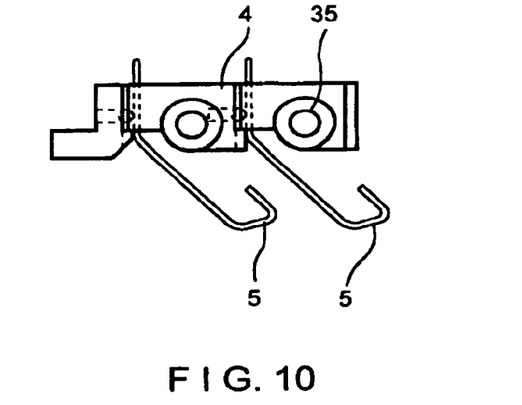
FIG. 10 is a side view of the contacts block.
Figure 11:
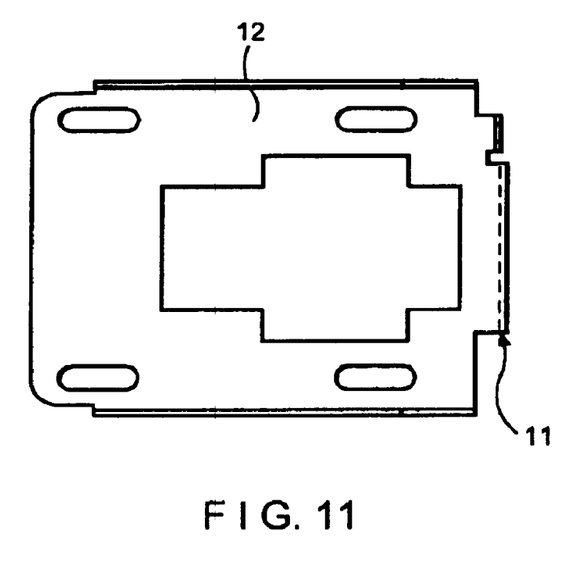
FIG. 11 is a plan view of the moving member.
Figure 12:
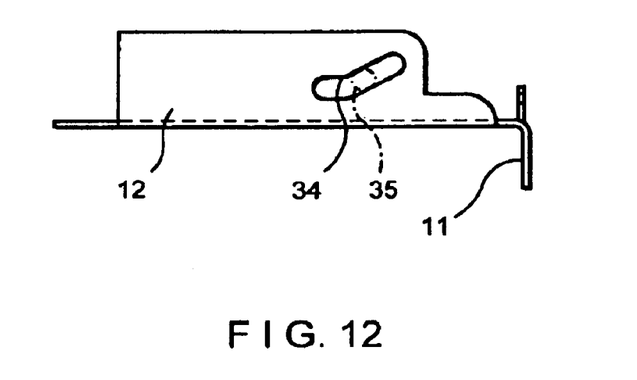
FIG. 12 is a side view of the moving member.
Figure 13:
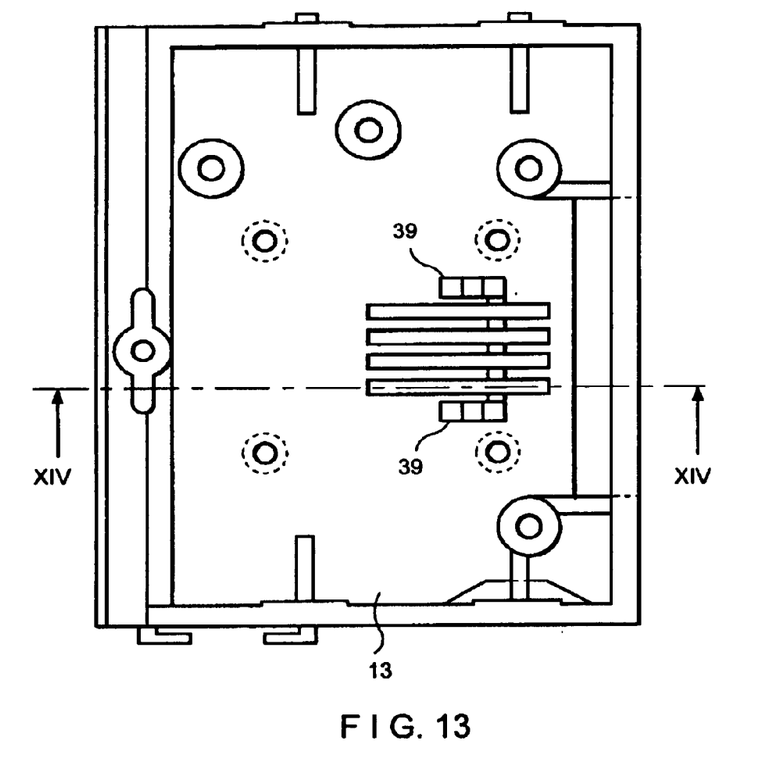
FIG. 13 is a plan view of frame.
Figure 14:
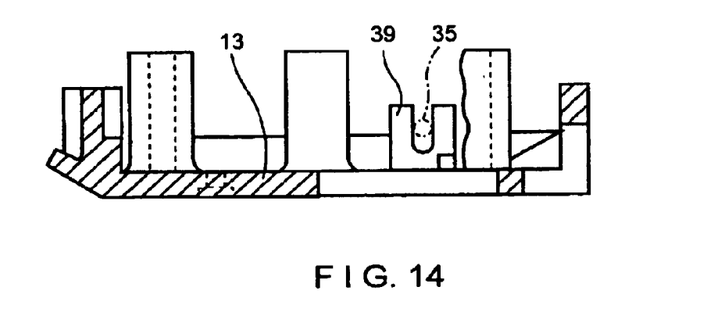
FIG. 14 is a cross-sectional view of FIG. 13 by XIV—XIV line.

In this embodiment, the contacts block 4 is provided capable of moving along the direction orthogonal to the card surface (the vertical direction in this embodiment). Further, the horizontally-placed transmission rod 35 passes through the contacts block 4, as illustrated in FIG. 9 and FIG. 10. The transmission rod 35 engages with vertically-guiding grooves 39, 39, which are provided on the frame 13, and also engages in a guide groove 34 provided in the moving member 12. The guide groove 34 is composed of diagonal groove and horizontal groove, as illustrated in FIG. 12, and moves the transmission rod 35 up and down as the moving member 12 moves in the horizontal direction. For this reason, the transmission rod 35 transmits its force in the up and down direction to the contacts block 4, following the horizontal movement of the moving member 12, to move the contacts block 4 close to or away from the card pathway 14.

Figure 7:
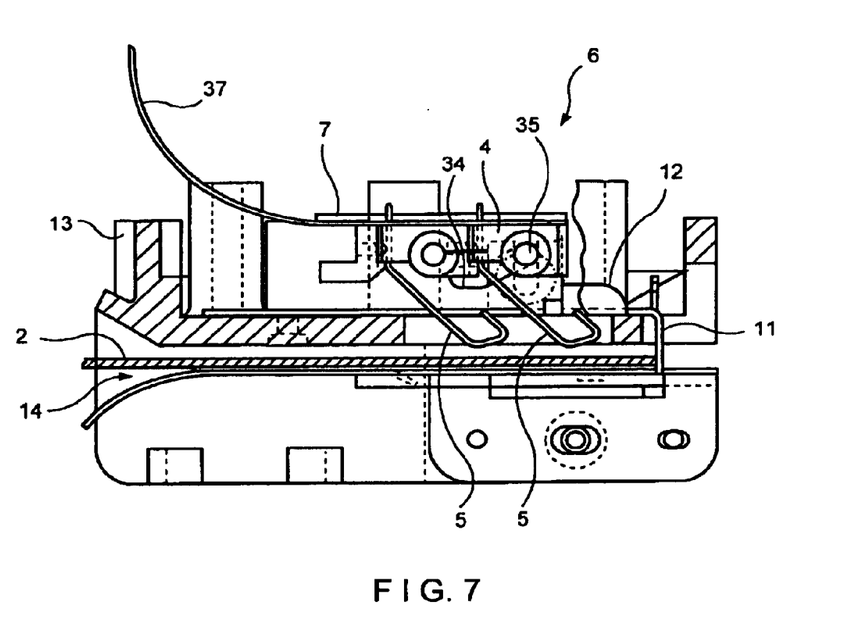
FIG. 7 is a side view of a contact block mechanism in another embodiment of the present invention.

The contacts block mechanism 1 configured as above functions in the following manner. First, the moving member 12 abides on the card insertion slot 29 side due to the pushing force of the pushing means 38 until the IC card 2 is inserted. During this time, as illustrated in FIG. 7, the contacts block 4 is away from the card pathway 14, and the contacts 5 are also receded to the position at which they cannot make contact with the IC card 2.

Figure 8:
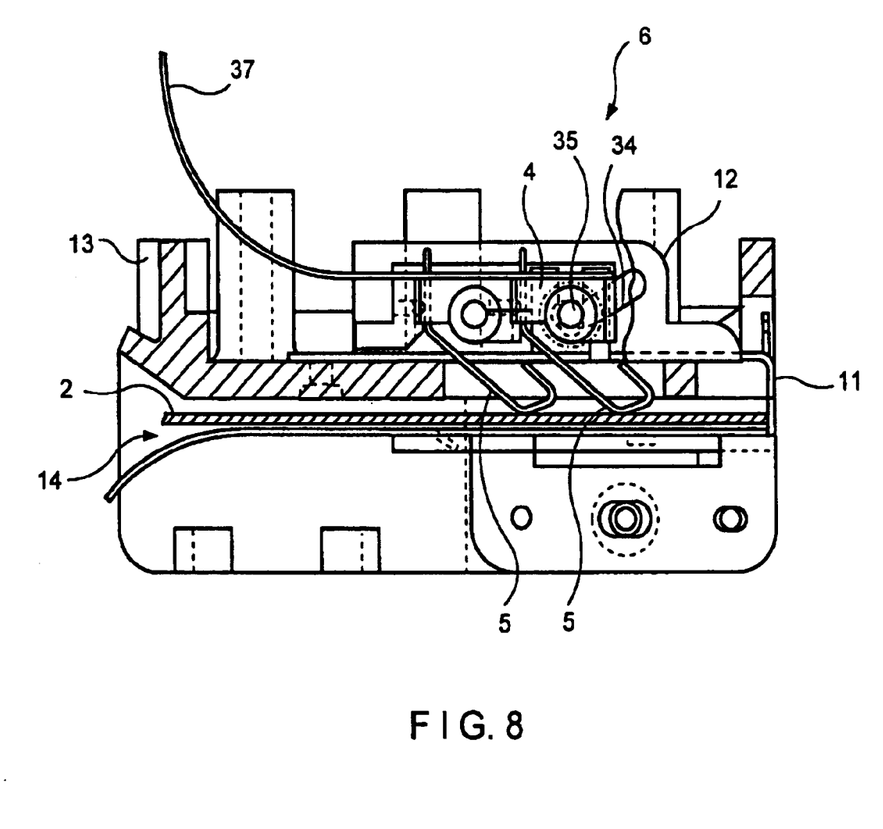
FIG. 8 shows the condition of the contacts block mechanism after switch and moving member are moved.

As the IC card 2 is inserted under the above condition, the IC card 2 that is moving in the card pathway 14 soon lets the front end thereof contact the switch 11 to move the switch 11 and moving member 12 in parallel. At this time, since the transmission rod 35 moves downwardly along the inclination of the guide groove 34, the contacts block 4 comes close to the card pathway 14 as illustrated in FIG. 8, and brings the contacts 5 into contact with the input/output terminal 3 on the IC card 2 at a predetermined position. Also, as the IC card is transported in reverse, the moving member 12 returns to the original position with the pushing force. Therefore, the contacts block 4 is separated from the card pathway 14 again.

Thus, the switch 11 and moving member 12 that function as a stopper stop the IC card 2 running in the card pathway 14 at a predetermined position in the card pathway 14. Therefore, there is no need to provide another stopper member separately. Also, since the IC card 2 is positioned in stop at a predetermined position when contacting the moving member 12, a stable, good contact condition can be obtained. Further, because the switch 11 and moving member 12 move in parallel to the running direction of the IC card 2, the front end of the IC card 2 and switch 11 move in parallel, thus causing no friction therebetween.

Note that, in the above described another embodiment, the horizontal groove as illustrated is extended from the end of the guide groove 34 which is close to the card insertion slot 29. The horizontal portion is useful to determine the position of the contacts block 4 by a predetermined distance away from the IC card 2 when the moving member 12 moves in the card running direction passing the diagonal portion of the guide groove 34.

In addition, in each of the above described embodiments, the control circuit board 7 is provided on the contacts block 4; however, a control component may be mounted in FPC and the cable function of FIG. 3 be equipped to connect (relay) the contacts block 4 to the main substrate 26. In this case, the cable and substrate can be eliminated, possibly reducing the number of the components.

As understood from the above description, according to the contacts block mechanism of the IC card reader of the present invention, the IC card control circuit board is mounted on the contacts block so that they move together. Therefore, the wiring distance between the input/output terminal on the IC card and the IC on the control circuit board can be short, thus preventing noise from occurring in the connection cable between the IC card and the control circuit board. Consequently, noise between lines (cross-talk) and disturbance can be reduced or totally removed so that the data transmission is not affected by noise. If a condenser has been used for removing noise, the condenser would now be unnecessary or one having a smaller capacity would be sufficient.

Furthermore, one end of the contacts held by the contacts block is directly connected with the IC card control circuit board, not via the connection cable. Therefore, any interference hardly occurs between signals, which is normally caused in such a connection cable in which each signal line is wired in parallel. Thus, it seldom causes errors in operation. It is also possible to reduce the number of the components.

According to the contacts block mechanism of the IC contact card reader of the present invention, the swing arm is driven to move the contacts block close to or far away from the IC card so that the contacts can be attached to or detached from the IC card.

Moreover, according to the contacts block mechanism of the IC contact card reader of the present invention, the IC contact card is made abut on the switch during the transportation so that the switch and the moving member can be moved in parallel and also the IC card can be placed in a predetermined position. For this reason, there is no need to provide another stopper member separately, but a good contact condition can be obtained between the contacts and IC card.

According to the contacts block mechanism of the IC contact card reader of the present invention, the switch and moving member move in parallel to the running direction of the IC card; therefore, a friction at the contact portion between the card front end and the switch can be eliminated.

Furthermore, according to the contacts block mechanism of the IC contact card reader of the present invention, the IC card control circuit board, contacts, etc. are fixed to the contacts block to make the entire contacts block mechanism as a modular unit. Therefore, for the replacement of the contacts block, only the modular unit is changed, and then attached to the frame.

While the foregoing description and drawings represent the present invention, it will be obvious to those skilled in the art that various changes may be made therein without departing from the true spirit and cope of the present invention.

What is claimed is:

1. A contacts block mechanism of an IC contact card reader having a contacts block that contacts an input/output terminal on a card surface of an IC contact card for signal transmissions, comprising:
    contacts placed in said contacts block for making contact with said input/output terminal, said contacts block being replaceable as a modular unit;
    contacts attach/detach means including a switch and a moving member, said contacts attach/detach means for moving said contacts block into contact with or away from said input/output terminal; and
    an IC card control circuit board mounted to said contacts block, to which one end of said contacts is electrically connected for signal transmissions with said IC card, said IC card control circuit board being operable to communicate with said IC card through said contacts of said contacts block;
    wherein said switch and said moving member move in parallel to a running direction of said IC card.

2. The IC contact card reader as set forth in claim 1 wherein the switch makes contact with or separates from the IC contact card during transporting, and said moving member is linked with the movement of the switch for bringing the contacts block into contact with the input/output terminal.

3. The contacts block mechanism according to claim 1, wherein said IC card control circuit board contains a control integrated circuit chip that controls communication between said IC card and a host processor.

4. A contacts block mechanism of an IC contact card reader having a contacts block that contacts an input/output terminal on a card surface of an IC contact card for signal transmissions, comprising:
    contacts placed in said contacts block for making contact with said input/output terminal, said contacts block being replaceable as a modular unit;
    contacts attach/detach means for moving said contacts block into contact with or away from said input/output terminal; and
    an IC card control circuit board mounted to said contacts block, to which one end of said contacts is electrically connected for signal transmissions with said IC card, said IC card control circuit board being operable to communicate with said IC card through said contacts of said contacts block;
    a frame, to which said members of said contacts block mechanism are fixed, and which, in turn, is attached to a predetermined position in said IC contact card reader.

5. An IC contact card reader comprising:
    a contacts block module operable to contact an I/O terminal disposed on an IC contact card, the contacts block module being replaceable as a modular unit and including:
        contacts disposed in the contacts block module for contacting the I/O terminal of the IC contact card; and a control circuit board mounted to the contacts block module for movement with the contacts block module, the contacts being electrically connected to the control circuit board, the control circuit board being operable to communicate with the IC contact card through the contacts and serving as a signal transmitter from the IC contact card to a processor housed in a main assembly of the IC contact card reader; and a contacts block module mover operable to bring the contacts into contact with the I/O terminal of the IC contact card and to move the contacts block module away from the I/O terminal.

6. The IC contact card reader as set forth in claim 5 wherein the contacts block module mover includes:

a swing arm that turns the contacts block module towards or away from the I/O terminal of the IC contact card; and an actuator for driving the swing arm.

* * * * *